United States Patent
Wolff

(10) Patent No.: US 6,408,006 B1
(45) Date of Patent: Jun. 18, 2002

(54) ADAPTIVE BUFFERING ALLOCATION UNDER MULTIPLE QUALITY OF SERVICE

(75) Inventor: Mark S. Wolff, Ottawa (CA)

(73) Assignee: Alcatel Canada Inc., Kanata (*) Notice: Subject to any disclaimer, the term of this patent is extended or adjusted under 35 U.S.C. 154(b) by 0 days.

(21) Appl. No.: 09/201,759

(22) Filed: Dec. 1, 1998

(30) Foreign Application Priority Data

Dec. 1, 1997 (CA) .............................................. 2223193

(51) Int. Cl.$^7$ ................................................ H04L 12/56
(52) U.S. Cl. .................................. 370/412; 370/395.42
(58) Field of Search .................................. 370/389, 395, 370/351, 352, 442, 443, 445, 444, 915, 461, 462, 401, 384, 428, 468, 411, 413–419, 449, 299, 230, 231, 235, 241, 252, 254, 412, 395.1, 395.2, 395.21, 395.4, 395.44, 395.42, 395.43, 395.71, 395.72; 340/825.5, 825.03, 825.01, 825.51, 825.52

(56) References Cited

U.S. PATENT DOCUMENTS

| | | | |
|---|---|---|---|
| 6,115,390 A | * | 9/2000 | Chuah .......................... 370/443 |
| 6,167,445 A | * | 12/2000 | Gai et al. .................... 709/223 |
| 6,226,277 B1 | * | 5/2001 | Chuah .......................... 370/328 |

* cited by examiner

*Primary Examiner*—Dang Ton
(74) *Attorney, Agent, or Firm*—Marks & Clerk

(57) ABSTRACT

A method is described for allocating buffers in a packet switched communication system offering different classes of service, each class of service being associated with a QoS queue. The optimal buffering is determined when a new packet for a particular QoS class arrives. The buffer limit is for the queue associated with said particular class in accordance with the determination, and new packet is handled according to the newly set buffer limit.

10 Claims, 4 Drawing Sheets

ADAPTIVE BUFFERING ALLOCATION UNDER MULTIPLE QUALITY OF SERVICE

FIELD OF THE INVENTION

This invention relates to a method of allocating buffers in a fast packet switched network, such as an ATM network or frame relay network, offering different QoS (Quality of Service) classes.

BACKGROUND OF THE INVENTION

The intention of QoS in a communication system, for example, one which is frame relay or ATM based for the purposes of discussion, is to allow the system to offer a differentiated service for applications with differing performance requirements, particularly in the areas of any information loss or delay which could occur during transfer. An example of two disparate applications which might simultaneously use QoS would be real time packet voice, and bulk electronic mail transfer. To achieve the goal of supporting multiple services, such communication networks and the switches that provide these services may need to add service categories with defined performance objectives for each quality of service.

Focusing on a switch, bridge, router etc. which is implementing QoS for packet (or cell) based communications, the architecture of such a node must be capable of buffering incoming packets. After or during packet processing, the transmit frame or cell scheduling algorithm creates the various service categories by determining the relative order with which the packets of multiple QoS levels should be transmitted. By virtue of the ordering of transmissions, a resulting delay can be incurred, particularly for lower performance service classes which may be large depending on the amount of higher priority traffic present at any given time. Packets which are delayed too long are considered stale and usually are dropped rather than delivered late. To limit the delay encountered by given packets or cells, and also limit the memory resources used by the switch, each QoS level is normally provided with either a buffering resource limit (memory), an aging limit (time) or both.

As examples of possible aging and resource implementations, enforcing aging could be done by recording the time when a packet arrived at the node and comparing it to the time when the packet is at the front of the transmission queue. In FIG. 1, packets A . . . G are placed in queues 1, 2, 3 of relating to different classes of service and having respectively highest, intermediate, and lowest priority. The enqueued packets are passed by the scheduler 5 into the interface 5 in a manner known per se. Packet D might need to wait for packets A–C to be transmitted first, depending on the scheduling algorithm applied. If the aging limit has expired by the time D is determined the next to be sent by the scheduling algorithm, D is discarded. For buffering resource limits, in FIG. 1 packet G is dropped immediately from the lowest priority QoS level since there is already packets D–F buffered and adding G would exceed the buffer limit. One could increase the buffer limit to allow packet G, but only at the cost of increased memory demands.

The problem presented is how to optimally allocate memory to a priority level. For certain periods of time, there may not be any higher priority traffic and all packets admitted inside the buffer limit to a lower priority level will be able to be transmitted within the aging limit. In FIG. 2, packets A–C will all be transmitted within the aging limit.

For other periods of time, there may be large amounts of priority traffic, where lower priority traffic will not have the opportunity to be transmitted without exceeding aging or buffering limits. Focusing only on the lowest priority queue in FIG. 3, packet K will be dropped as expected due to buffering limits. However packets G–J will also eventually be dropped since they will not meet aging limits after packets A–F are transmitted first. Thus packets G–J are buffered despite having no chance of being transmitted.

Therefore, under congestion scenarios there will be node buffering resources uselessly allocated for lower priority class use. If the node has many different priorities per transmission interface and numerous transmission interfaces, the potential waste of buffer resources could become extremely significant.

An object of the invention is to reduce the amount of waste buffering under QoS transmission.

SUMMARY OF THE INVENTION

Accordingly the present invention provides a method of allocating buffers in a packet switched communication system offering different classes of service, each class of service being associated with a QoS queue, comprising the steps of computing the optimal buffering when a new packet for a particular QoS class arrives, setting the buffer limit for the queue associated with said particular class in accordance with said determination, and handling said new packet according to said set buffer limit.

Typically, the newly arrived packet is accepted into the queue or discarded according to the newly set queue size.

If the buffer limit is already set at the appropriate value, of course no change to the limit is actually required in order to set it to the desired value.

The buffering allocation for QoS in accordance with the invention is preferably performed by taking into account the timestamp of the frame or cell at the head of a given QoS queue, the transmission line speed, and the aging limit configured for the QoS class. As each newly processed frame or cell is placed into a particular QoS transmission queue, the optimal buffering at that point in time is determined and used to set the buffer limit for the queue, which in turn is used to determine how the new frame or cell is handled.

It is important to note that the invention is not dependent on the priority scheduling algorithm and can be applied to any QoS level. It is not computationally intensive, has low variable storage requirements and can be implemented in a real time system.

The term packet will be used herein to denote both frame and cell based systems.

The invention also provides a packet switched communication system offering different classes of service, each class of service being associated with a QoS queue, comprising means for determining the optimal buffering when a new packet for a particular QoS class arrives, means for setting the buffer limit for the queue associated with said particular class in accordance with said determination, and means for handling said new packet according to said newly set buffer limit.

BRIEF DESCRIPTION OF THE DRAWINGS

The invention will now be described in more detail, by way of example, only with reference to the accompanying drawings, in which.

DESCRIPTION OF THE PREFERRED EMBODIMENTS

In order to fully understand the invention, the following definitions are required per QoS queue on a given transmission line:

Pqx is the timestamp associated with packet x in the queue for the QoS class, determined when the packet first arrived at the node (in seconds, relative to a fixed point in time, to an adequate number of decimal places).

Sqx is the length of packet x.

Hq is the timestamp for the packet at the head of a given QoS queue, taken from Pqx.

Tq is the configured aging limit for the QoS class (in seconds, to an adequate number of decimal places).

Lq is the buffer limit for the QoS class (in octets).

Bq is the current amount of buffering being used for the QoS class.

The following definitions are used by all QoS queues:

R is the transmission line speed (in bits per second).

C is the current time, the timestamp associated with a newly arrived packet (in seconds, relative to a fixed point in time, to an adequate number of decimal places).

The preferred method works as follows in accordance with the principles of the invention.

At the start, R is known, Tq is configured, Bq is zero, C is system defined, and Hq is undefined.

When a packet arrives at a node, the current value of C is associated as a timestamp with the packet, stored as Pqx. If/when that packet makes it to the head of a given QoS queue, this timestamp becomes the variable Hq. If there is no packet at the head of a given QoS queue, then Hq=Pqx=C. Lq is calculated by subtracting from the desired delay of the entering packet the present delay already encountered by the packet at the head of the queue:

$$Lq=[Rbps/8\ bpoctet]*[Tq-[C-Hq]],$$

where Tq and [C-Hq] must be $\geq 0$

Bq for the QoS queue is incremented by the number of bytes in the packet Sqx. If the result is that Bq>Lq, then the packet will not meet the aging limit, the packet is dropped and Bq is decremented by Sqx to return it to its original value. When a packet 'x' finishes being transmitted, Bq is decremented by the number of bytes in the packet, and the next packet in the queue becomes the head of queue, where its Pqx how defines Hq. If 'x' was the last packet in a given QoS queue, the Hq returns to undefined. The test of Bq>Lq applies only to when new frames are being introduced.

Figure 1:
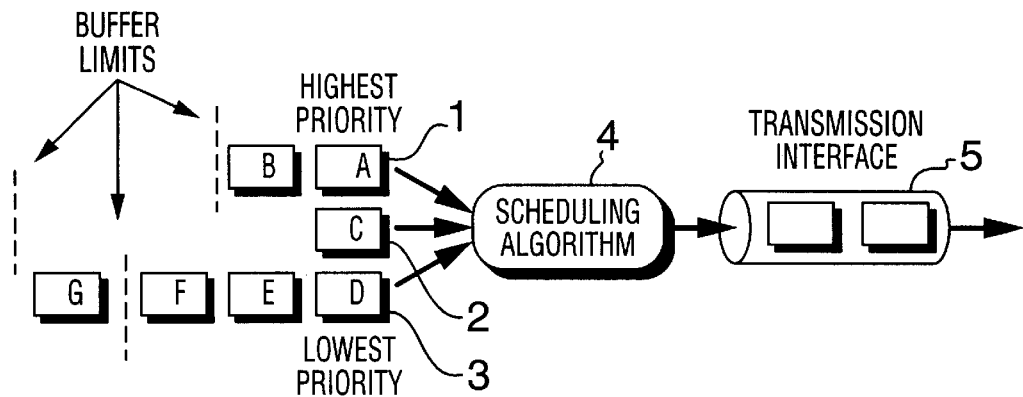
FIG. 1 shows an example of a known Multiple Quality of Service System.
Figure 2:
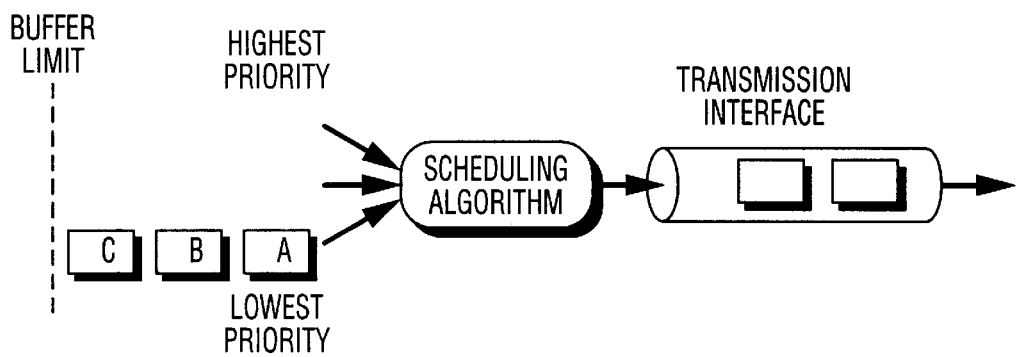
FIG. 2 shows buffering when only low priority traffic is present in the known system.
Figure 3:
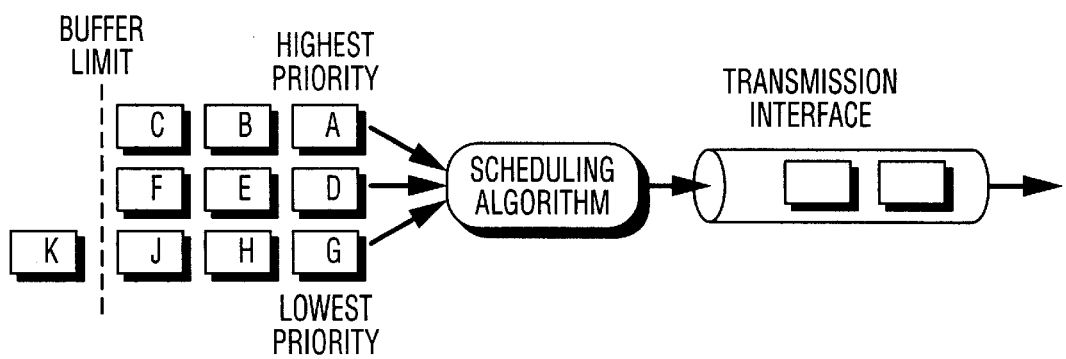
FIG. 3 shows buffering when high and low priority traffic is present in the known system.
Figure 4:
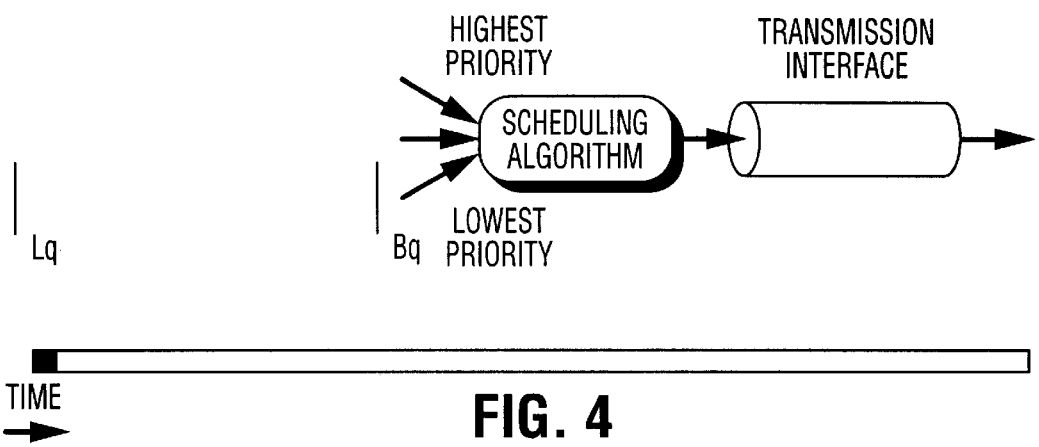
FIG. 4 shows the Start of Quality of Service Adaptive Buffering Frame Sequence in accordance with one embodiment of the invention.

Graphically, focusing on the lowest priority queue for the purposes of illustration, the method works as follows. A sequence of time is portrayed. At the start, as shown in FIG. 4, no frames are queued to any priority level.

Figure 5:
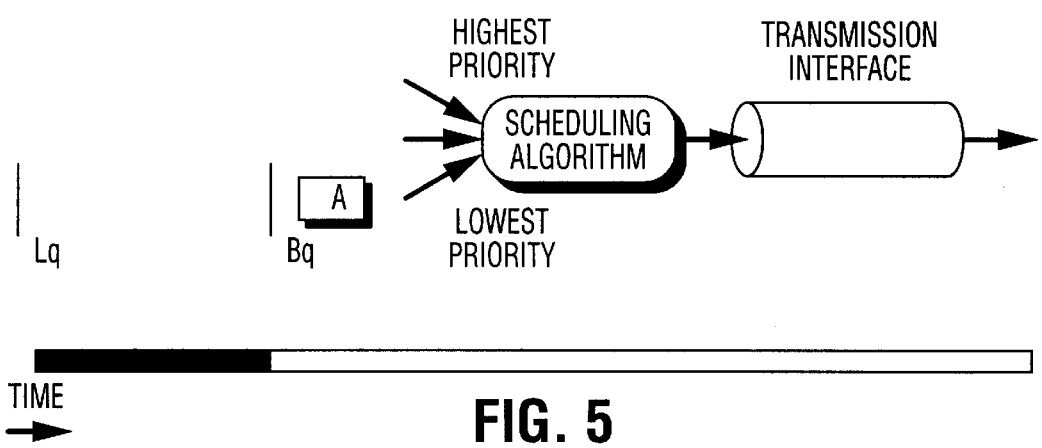
FIG. 5 shows Low Priority Traffic Only.
Figure 6:
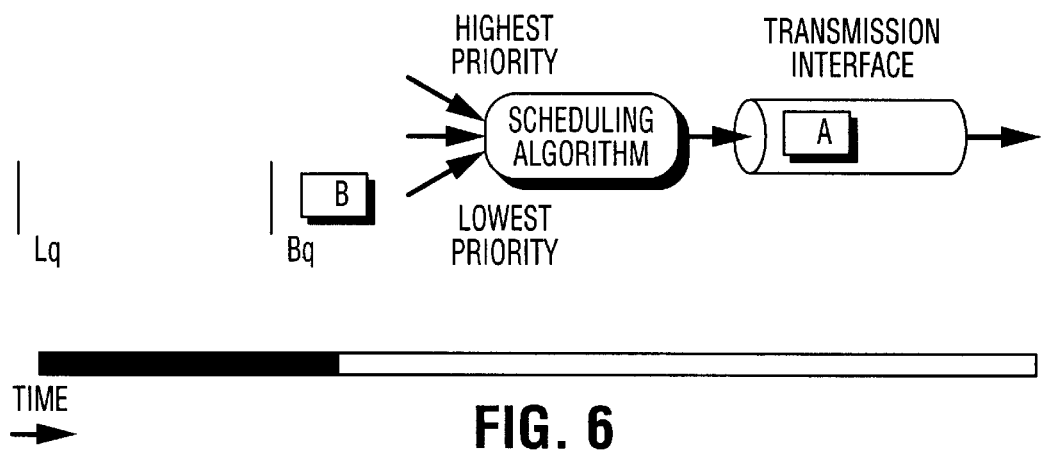
FIG. 6 shows Low Priority Traffic Only Continued.

As shown in FIG. 5, packet A arrives destined for the lowest priority queue, and becomes head of queue. Since Hq=Pqx=C, there is no change to Lq, but Bq increases by the size of the frame. Lq is at its maximum and will remain there in the absence of higher priority traffic, regardless of the number of lowest priority packets that are queued (following of course the limitation that Bq<=Lq). This is shown in FIG. 6, where packet B arrives after A has been transmitted.

Figure 7:
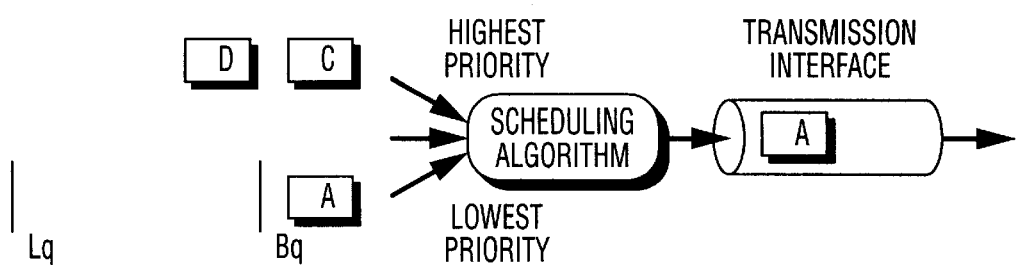
FIG. 7 shows the higher priority traffic added.

Before Packet B can be transmitted, packets C and D arrive (FIG. 7) on a higher priority queue.

Figure 8:
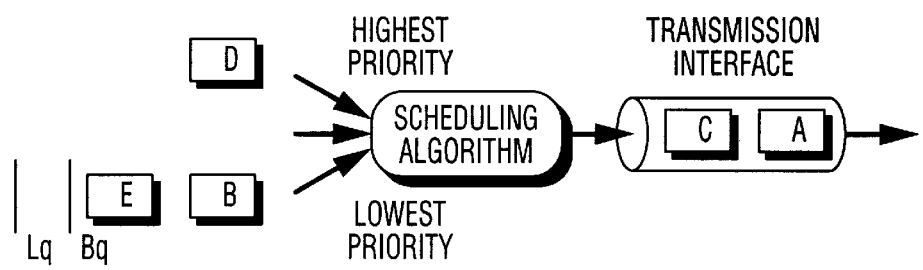
FIG. 8 shows the Higher Priority Traffic Transmitted in Preference to Lower Priority Traffic.

While packet C is being transmitted in preference to packet B due to its higher priority, packet E arrives destined for the lowest priority queue (FIG. 8). Lq for the lowest priority queue is recalculated using the head of queue timestamp of packet B and the timestamp of newly arrived packet E, with the result being a lower Lq. However the new Bq does not exceed Lq so packet E is admitted.

Figure 9:
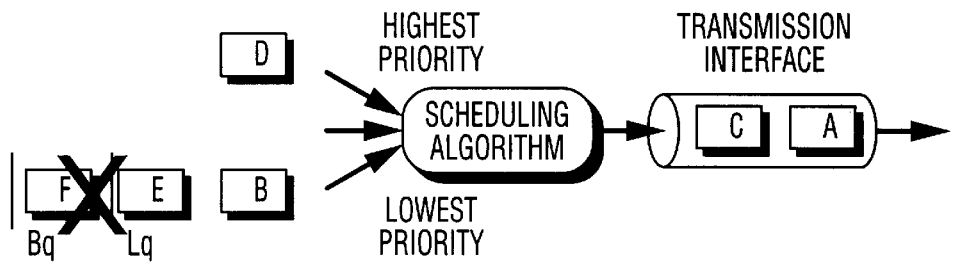
FIG. 9 shows the Lower Priority Traffic Discarded due to Adaptive Buffering.

Packet F (FIG. 9) arrives destined for the lowest priority queue while packet D is being transmitted. It results in a Bq that is larger than Lq and thus the packet is dropped. Packets B and E are not affected by the changes to either Bq and Lq.

Figure 10:
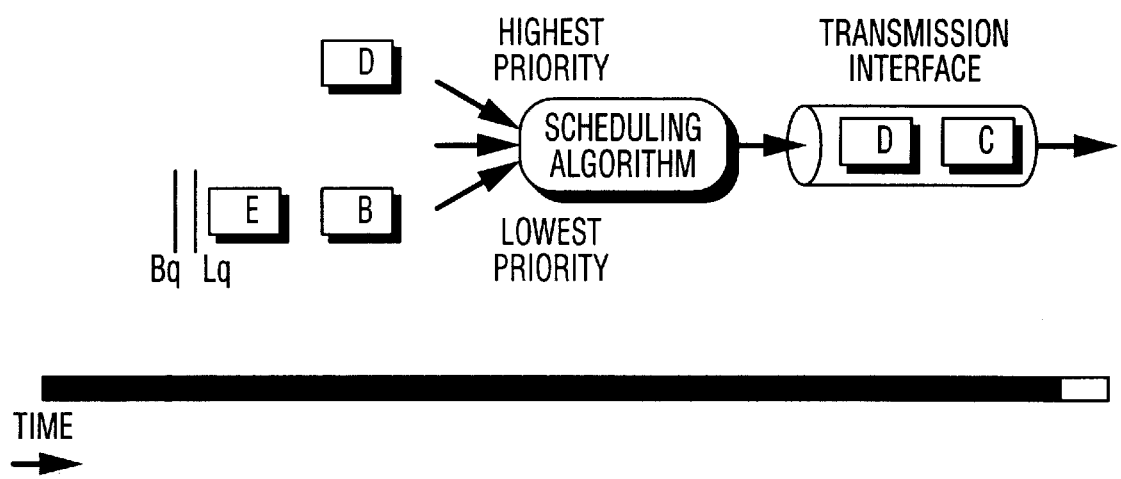
FIG. 10 shows the Lower Priority Traffic Only.

Once packet D finishes transmitting, packets B and E will be transmitted (FIG. 10) presuming that their timestamp shows that they have not exceeded age limits.

An optimization which may be added to the described method, depending on the cost to real time processing capabilities, is: when a frame arrives destined for a given queue, before calculating Lq first check if the frame at the head of the queue has exceeded its aging limit and thus can be dropped (optionally this could be extended to the 'new' head of queue frame as well, again depending on the real time processing impact). Dropping aged frames as soon as possible creates buffering space for newly arriving frames, which may have a chance to be transmitted.

The described method has the advantages that it provides buffering for all packets which have the potential to be transmitted within desired aging limits, it adjusts buffering levels dynamically based on current conditions, it reduces buffering requirements by not buffering packets that will end up being dropped due to exceeding aging limits, it is not dependent on priority scheduling algorithm employed for quality of service, the method has low storage requirements and computational load, will easily work in real time systems, and the same method can be used regardless of level of quality of service implemented on.

I claim:

1. A method of allocating buffers in a packet switched digital communication system offering different classes of service, each class of service being associated with a QoS queue having a different priority, comprising the steps of:

storing, for an incoming packet arriving at a node and associated with a class of service q, current time C as a timestamp Pqx;

passing said incoming packet into a QoS queue for said class of service q associated with said incoming packet;

setting a variable Hq equal to Pqx when said incoming packet arrives at the head of its queue;

determining from said variable Hq a buffer limit Lq for the queue associated with said class of service q;

maintaining a variable Bq representing the amount of buffering in said queue associated with said class of service q; and dropping a new incoming packet for said class of service q if said new incoming packet would result in said variable Bq being greater than said buffer limit Lq.

2. A method allocating buffers in a packet switched communication system offering different classes of service, each class of service being associated with a QoS queue, comprising the steps of making a determination of an optimal buffering when a new packet for a particular QoS class arrives, setting a buffer limit for the queue associated with said particular class in accordance with said determination, and processing said new packet according to said buffer limit, and wherein when an incoming packet arrives at a node, a current value of C, wherein C represents current time, is associated as a timestamp with the new packet, stored as Pqx; if/when the new packet makes it to the head of a given QoS queue, this timestamp becomes a variable Hq; if there is no packet at the head of a given QoS queue when the new packet arrives, then Hq=Pqx=C; Lq is calculated by subtracting from a configured aging limit of the new packet a present delay already encountered by a packet at the head of the queue; Bq for the QoS queue is incremented by the number of bytes in the packet Sqx, where Bq represents the amount of buffering in the given Qos queue; if for an incoming packet the result is that Bq>Lq, the incoming packet is dropped and Bq is decremented by Sqx to return it to its original value; and when a packet as finished being transmitted from the given Qos queue, Bq is decremented by the number of bytes in the transmitted packet, and a next packet in the queue, if present, becomes the head of queue, where its Pqx for the next packet now defines Hq; and if the transmitted packet was the last packet in the given QoS queue, Hq returns to an undefined value.

3. A method as claimed in claim 1, wherein said variable Bq is incremented by a number of bytes Sqx when an incoming packet arrives, and if said incoming packet is dropped due to the condition Bq>Lq being met or when said incoming packet is transmitted, said variable Bq is decremented by the amount of bytes Sqx said packet that is dropped or transmitted.

4. A method as claimed in claim 3, wherein said buffer limit Lq for the queue associated with the class of service q is calculated from a configured aging limit for an incoming packet and a present delay encountered by a packet at the head of the queue associated with said class of service q.

5. A method as claimed in claim 4, wherein said present delay is determined by subtracting said variable Hq from current time C.

6. A method as claimed in claim 5, wherein said buffer limit Lq for the queue associated with the class of service q is calculated by subtracting said present delay encountered by said packet at the head of the queue associated with said class of service q from said configured aging limit.

7. A method as claimed in claim 6, wherein Lq is calculated in accordance with the expression:

$$Lq=[Rbps/8\ bpoctet]*[Tq-[C-Hq]],$$

where Tq and [C−Hq] must be $\geq 0$, and where Rbps is transmission line speed in units per second, and Tq is a configured aging limit for the class of service q.

8. A method as claimed in claim 1, wherein an incoming packet arrives, a determination is first made as to whether a packet at the head of the queue has exceeded an aging limit associated therewith, and if said packet at the head of the queue has exceeded said aging limit said packet at the head of the queue is dropped prior to determining said buffer limit Lq for the new incoming packet.

9. A method as claimed in claim 8, wherein if said packet at the head of the queue is dropped, a further determination is made as to whether a new packet at the head of the queue has exceeded an aging limit associated therewith, and if said new packet at the head of the queue has exceeded an aging limit associated therewith said new packet is dropped.

10. A method as claimed in claim 1, wherein said packets are frames.

* * * * *